(12) United States Patent
Boxer

(10) Patent No.: US 7,890,372 B1
(45) Date of Patent: Feb. 15, 2011

(54) ELECTRONIC DEVICE FOR VERIFYING A USER'S PERSONAL INFORMATION AND ASSOCIATED METHOD

(76) Inventor: Doreen C. Boxer, 348-A Ford, St. Watsonville, CA (US) 95076

( * ) Notice: Subject to any disclaimer, the term of this patent is extended or adjusted under 35 U.S.C. 154(b) by 7 days.

(21) Appl. No.: 12/462,276

(22) Filed: Jul. 31, 2009

Related U.S. Application Data

(63) Continuation-in-part of application No. 11/043,251, filed on Jan. 27, 2005, now abandoned.

(51) Int. Cl.
   *G06Q 20/00* (2006.01)
   *A47G 29/00* (2006.01)
   *A47F 5/00* (2006.01)
   *A47F 7/00* (2006.01)
   *F16M 13/00* (2006.01)

(52) U.S. Cl. ............... 705/18; 248/371; 248/125.7; 248/125.8; 248/125.9

(58) Field of Classification Search .................. None
   See application file for complete search history.

(56) References Cited

U.S. PATENT DOCUMENTS

| | | | |
|---|---|---|---|
| 5,960,100 A | 9/1999 | Hargrove | |
| 6,263,090 B1 | 7/2001 | Scott et al. | |
| 6,453,301 B1 | 9/2002 | Niwa | |
| 6,591,249 B2 | 7/2003 | Zoka | |
| 6,636,620 B1 | 10/2003 | Hoshino | |
| 7,080,037 B2 * | 7/2006 | Burger et al. | 705/50 |
| 7,380,759 B1 * | 6/2008 | Whiteside et al. | 248/183.1 |
| 2003/0132292 A1 * | 7/2003 | Gomez et al. | 235/383 |

FOREIGN PATENT DOCUMENTS

CA    2189816    * 11/1996

* cited by examiner

*Primary Examiner*—F. Ryan Zeender
*Assistant Examiner*—Fahd A Obeid

(57) ABSTRACT

An electronic point-of-sale authorization device is removably attachable to an auxiliary register system for verifying the identity of a user during point-of-sale transactions. The device may include a user interface, a microprocessor coupled with a memory, displays, fingerprint and card readers, an electronic pen and a communication link. The device may further include a mechanism for pivotally oscillating the housing and a mechanism for linearly reciprocating a telescopic support rod. A user interface may be communicatively linked to the pivotally oscillating mechanism and linearly reciprocating mechanism such that the housing may pivotally oscillate about a pivot axis while the support rod telescopically reciprocates along a vertical axis respectively. In addition, the housing may be freely rotated about the pivot axis while each of the support rod and the mounting bracket remain at static positions.

5 Claims, 16 Drawing Sheets

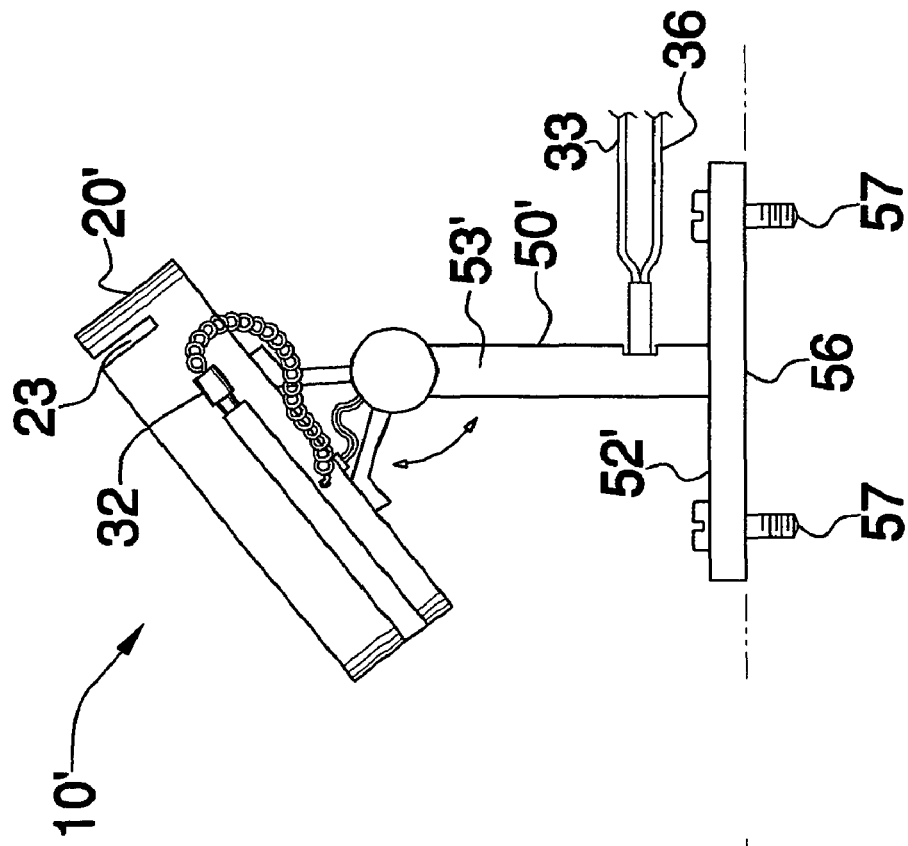
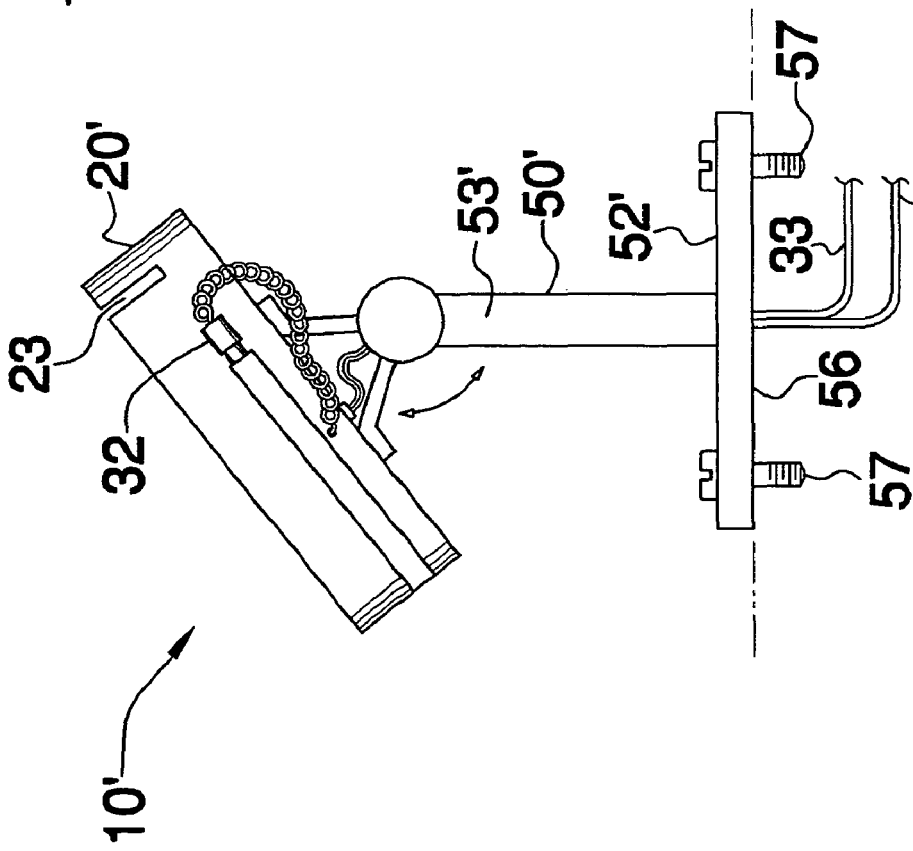

ELECTRONIC DEVICE FOR VERIFYING A USER'S PERSONAL INFORMATION AND ASSOCIATED METHOD

CROSS REFERENCE TO RELATED APPLICATIONS

This is a continuation-in-part application claiming the benefit of U.S. patent application Ser. No. 11/043,251, filed Jan. 27, 2005, now abandoned which is incorporated herein by its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a device for verifying personal information and, more particularly, to an electronic device removably attachable to an auxiliary register system for verifying a user's personal information during point-of-sale transactions. The present invention is an improvement to U.S. patent application Ser. No. 11/043,251, which is incorporated herein by reference in its entirety.

2. Prior Art

The use of thumb print readers is known in the prior art. More specifically, thumb print readers heretofore devised and utilized for the purpose of scanning a thumbprint are known to consist basically of familiar, expected and obvious structural configurations, notwithstanding the myriad of designs encompassed by the crowded prior art which have been developed for the fulfillment of countless objectives and requirements. Cash register systems which enable the performance of transactions, such as cash issuance at terminals remote from and in communication with a host data processing system having a central database in which account and other information is stored, are well known.

Such systems, which are frequently used by grocery stores and other commercial settings to extend their services, and permit the completion of a transaction through a cash register. Such a cash register typically includes a mechanism for receiving and reading information from a card, a user input such as a keyboard, a display and document entry and exit apertures.

Issuing a personal ID number with each credit/debit card attains increased security for the issuance of cash or other transactions without intervention of a second party. A credit/debit card transaction is then enabled only when an ID number corresponding to the account number read from the credit/debit card is entered through the keyboard. This required correspondence prevents a thief or mere finder of a credit/debit card from receiving cash, for example, from a terminal or a cash register.

Upon entry by a terminal user or a customer of a credit/debit card and personal identification number, the terminal is instructed to communicate the credit/debit card data and the personal identification number to the host for authorization of the transaction. At the host, a database of identification numbers is accessed by the card data. The identification number obtained from the database is compared with the personal identification number received from the terminal to perform a host PIN check.

When ID cards, credit cards or debit cards are stolen, passwords and/or ID numbers read from card can be decrypted. Thus, presenting a password or a personal identification number with a card is woefully inadequate in preventing individuals other than the registered users from accessing the computer. Obviously, it would be advantageous to use a means of identification that is absolutely unique to the credit/debit card holder, such as their fingerprint.

Accordingly, a need remains for an electronic device for verifying a user's personal information in order to overcome the above-noted shortcomings. The present invention satisfies such a need by providing an electronic identity verifying device that improves the support bracket used to hold the authorization device at a location that is accessible by a customer and a store clerk at a point-of-sale location. Such a device is easy to use by selectively pivoting the authorization device to a desired location, which both a store clerk and a customer can access. This saves all parties involved a great amount of time, energy and most importantly, money.

BRIEF SUMMARY OF THE INVENTION

In view of the foregoing background, it is therefore an object of the present invention to provide an electronic device for verifying a user's personal information. These and other objects, features, and advantages of the invention are provided by an electronic device removably attachable to an auxiliary register system for verifying the identity of the user during point-of-sale transactions.

The present invention is an improvement to U.S. patent application Ser. No. 11/043,251, which is incorporated herein by reference in its entirety. Such an improvement preferably includes an electronic point-of-sale authorization device removably attachable to an auxiliary register system (not shown but well known in the art) for verifying the identity of a user during point-of-sale transactions. The electronic point-of-sale authorization device may include a tray and a housing directly seated thereon and a microprocessor positioned within the housing.

Further, a memory may be electrically coupled to the microprocessor, preferably including software instructions that cause the device to perform the steps of instructing the user to place at least one metacarpal on a fingerprint reader. The microprocessor may further cause the scanning of a print of the metacarpal into a temporary storage medium; scanning a remotely located central database preferably housing a plurality of pre-scanned fingerprint data and comparing the user's fingerprint with the database. In this manner, the identity of the user can be determined based on a matching fingerprint data found in the database such that a register system verifies the user's identity if the matching fingerprint data is located in the database and thereby allows the user to complete the point-of-sale transaction without providing a picture ID.

The device may preferably include a user interface situated on the housing, and may preferably include a display screen and an associated implement electrically coupled thereto such that the user may sign their name on the display screen in an electronic format. A communication link may be operably connected to the microprocessor for transmitting data signals to the register system during operating conditions. Additionally, a personal identification card reader may be electrically coupled to the microprocessor such that a user may swipe their identification card through the card reader to initiate a verification process.

Notably, the device may further include a mechanism for pivotally oscillating the housing and the tray about a pivot axis disposed beneath the tray, whereby the pivotally oscillating mechanism may include a mounting bracket adapted to be removably secured to a support surface. The pivotally oscillating mechanism may further include a telescopic support rod having a longitudinal axis oriented perpendicular to the pivot axis, whereby the support rod may further have axially opposed top and bottom ends directly coupled to the tray and the mounting bracket respectively.

The pivotally oscillating mechanism may further include a pair of cog wheels equidistantly spaced apart from the support rod, such that each of the cog wheels may be integrally coupled to the tray. The pivotally oscillating mechanism may further include a rectilinear drive shaft passing through the support rod and preferably registered orthogonal to a longitudinal length of the support rod. A pair of spurred gears may be statically mated to opposed ends of the drive shaft respectively. Each of the cog wheels may further be provided with a toothed arcuate inner surface spaced from the opposed ends of the drive shaft, such that the spurred gears are rotatably reciprocated along the toothed arcuate inner surfaces and thereby preferably cause the cog wheels to pivot along first and second curvilinear paths defined about the pivot axis.

In addition, the device may include a first motor communicatively coupled to a user interface and the drive shaft. In this manner, the first motor causes the drive shaft to rotate along clockwise and counter clockwise directions upon receiving an input signal from the user interface. The device may further include a second motor communicatively coupled to the user interface and a linearly telescoping mechanism. In this manner, the second motor cooperates with the linearly telescoping mechanism and thereby causes the support rod to linearly reciprocate along a vertical axis defined orthogonal to the pivot axis.

The pivotally oscillating mechanism may further include a rectilinear driven shaft juxtaposed above the drive shaft and statically anchored to the pair of cog wheels respectively. The device may further include an anchor block fixedly nested within a top most end of the support rod such that each of the cog wheels simultaneously rotates in sync with the driven shaft as the drive shaft is simultaneously articulated in sync with the spurred gears.

Further, the first motor and the second motor may be simultaneously actuated such that the support rod may telescopically reciprocate along the vertical axis while both the tray and the housing pivotally reciprocate about the pivot axis. Advantageously, the tray and the housing are freely rotated about the pivot axis while both the support rod and the mounting bracket remain at static positions respectively. In this manner, the housing and the tray may be tilted toward opposed first and second sides of the mounting bracket as the cog wheels rotate in sync along the first and second curvilinear paths respectively.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 8 is a side elevational view of the device shown in FIG. 5, showing the rectangular mounting bracket wherein the USB cable and the power cord extends from the bottom of the support bracket;

FIG. 9 is a side elevational view of the device shown in FIG. 8, showing the USB cable and the power cord extending from the pivot rod;

DETAILED DESCRIPTION OF THE INVENTION

Figure 1:
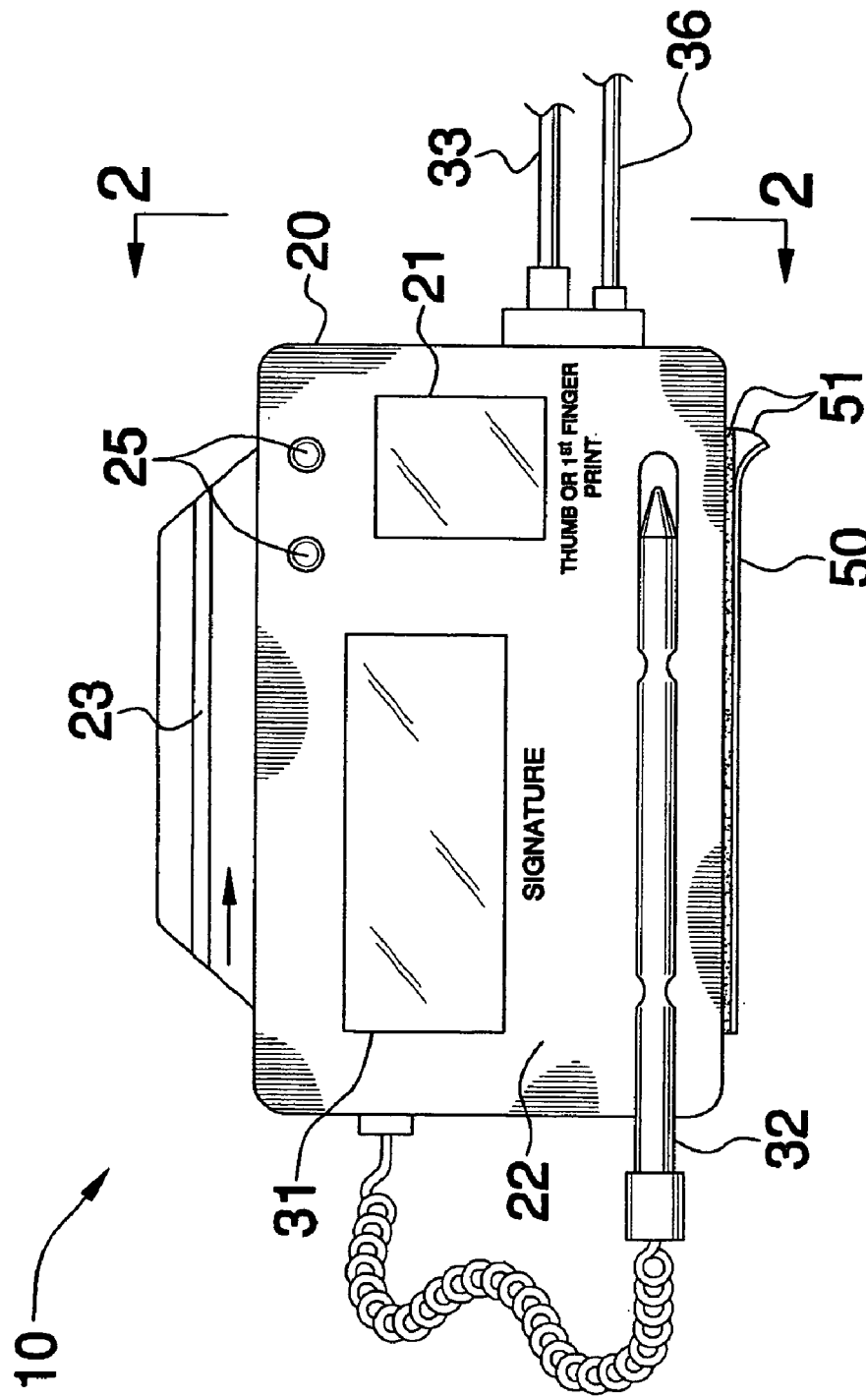
FIG. 1 is a front elevational view showing an electronic device for verifying a user's personal information, in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime and double prime numbers refer to alternate embodiments of such elements.

The device of this invention is referred to generally in FIGS. 1-18 by the reference numeral 10 and is intended to provide an electronic device for verifying a user's personal information. It should be understood that the device 10 may be used to verify personal information in many different types of settings and should be construed as limited in use to only verifying a user's personal information during point-of-sale transactions.

Figure 7:
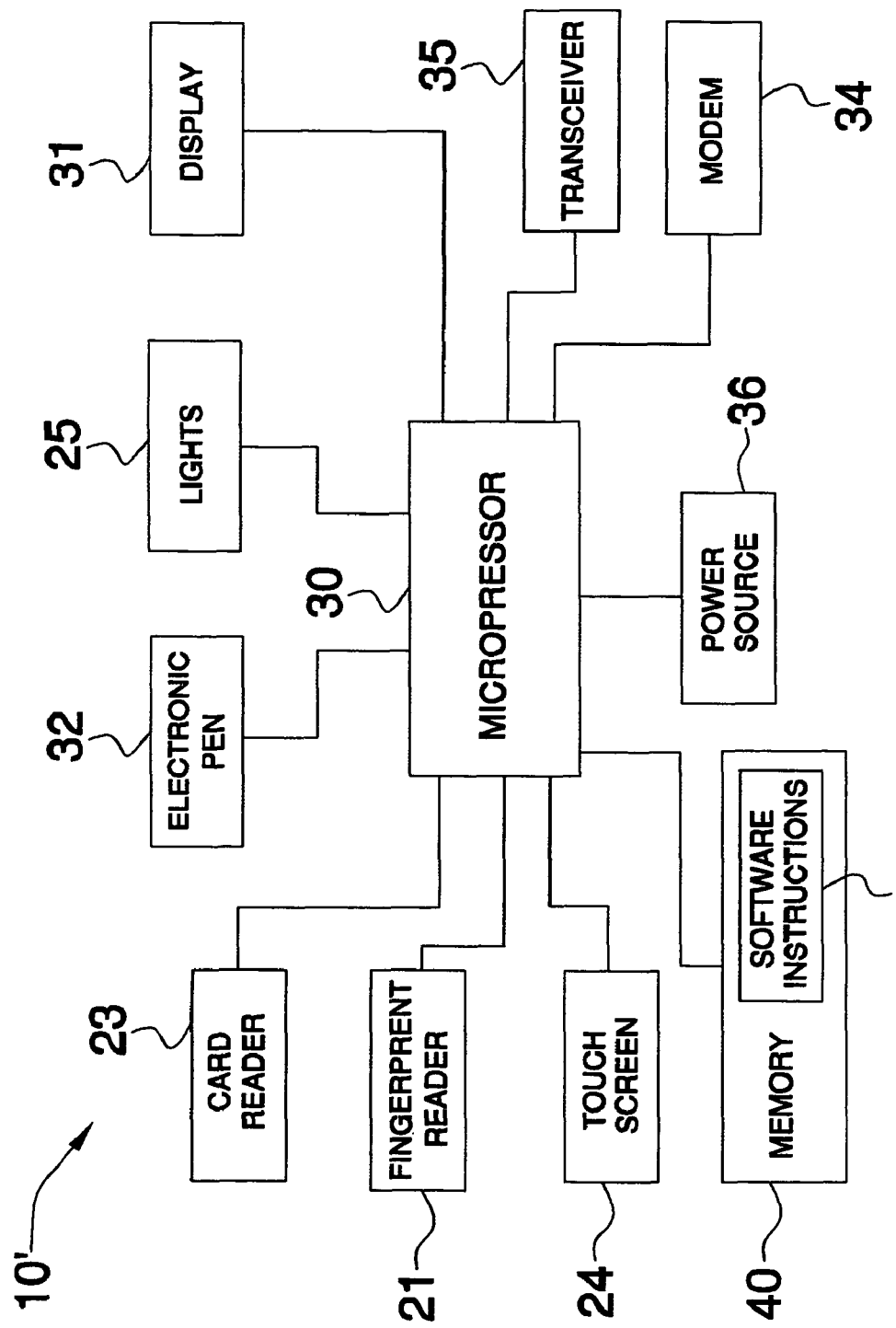
FIG. 7 is a schematic block diagram of the device shown in FIG. 5.

Referring initially to FIGS. 1 and 7, the device 10 includes a housing 20, a microprocessor 30 positioned within the housing 20, and a memory 40 electrically coupled to the microprocessor 30. Such a memory 40 includes software instructions 41 that cause the device 10 to perform the steps of instructing the user to place at least one metacarpal on a fingerprint reader 21 and scanning a print of the metacarpal into a temporary storage medium. Subsequent steps performed include scanning a remotely located central database housing a plurality of pre-scanned fingerprint data and comparing the user's fingerprint with the database such that the identity of the user can advantageously be determined based on matching fingerprint data found in the database. The register system verifies the user's identity if matching fingerprint data is located in the database, thereby conveniently allowing the user to complete the point-of-sale transaction without providing a picture ID.

Figure 5:
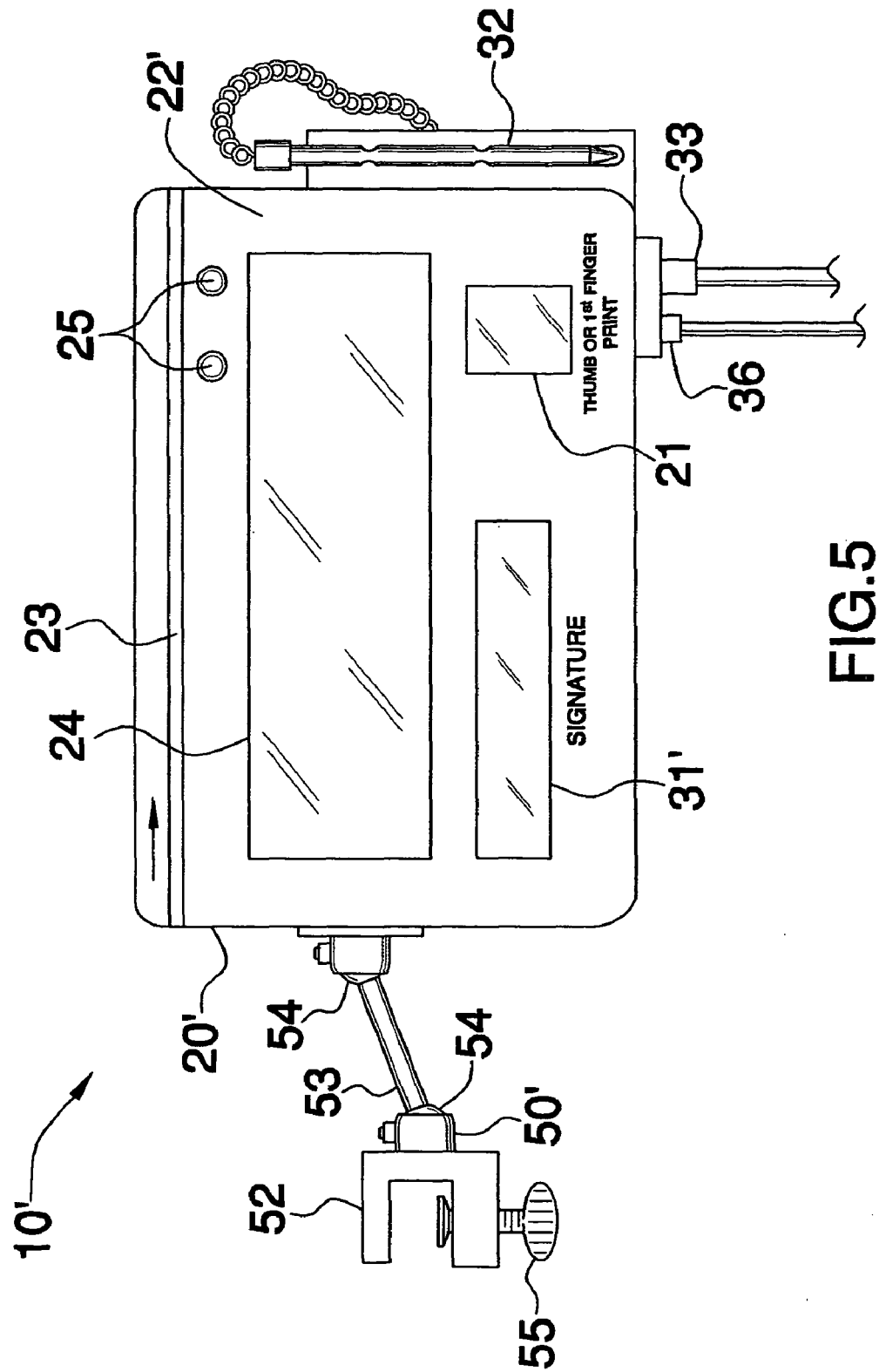
FIG. 5 is a front elevational view showing yet another embodiment of the device shown in FIG. 1.

Referring to FIGS. 1, 5 and 7, a user interface 22 is situated on the housing 20. Such a user interface 22 includes a display screen 31 and an associated implement 32 electrically coupled thereto such that the user may effectively sign their name on the display screen 32 in an electronic format.

Referring to FIGS. 1 and 7, a communication link 33 is operably connected to the microprocessor 30 for transmitting data signals to the register system during operating conditions. Such a communication link 33 includes a modem 34 such that the device 10 can effectively communicate with the register system and the remotely located fingerprint database through a telephony data transfer system. The communication link 33 also include a transceiver 35 for wirelessly transmitting and receiving a control signal to the register system and the remotely located fingerprint database wherein the control signal provides a series of encrypted instructions embedded in a RF transmission signal.

Referring to FIGS. 1 through 5, 7, 8 and 9, a personal identification card reader 23 is electrically coupled to the microprocessor 30 wherein the user may swipe their identification card through the reader 23 to initiate a verification process. Of course, such a personal identification card reader 23 may be located along any surface of the housing 20, as is well known to an individual of ordinary skill in the art. Still referring to FIGS. 1 through 5, 7, 8 and 9, a power source 36 is electrically mated to the housing 20 for effectively providing a selected power supply to the device 10 during operating conditions.

Figure 2:
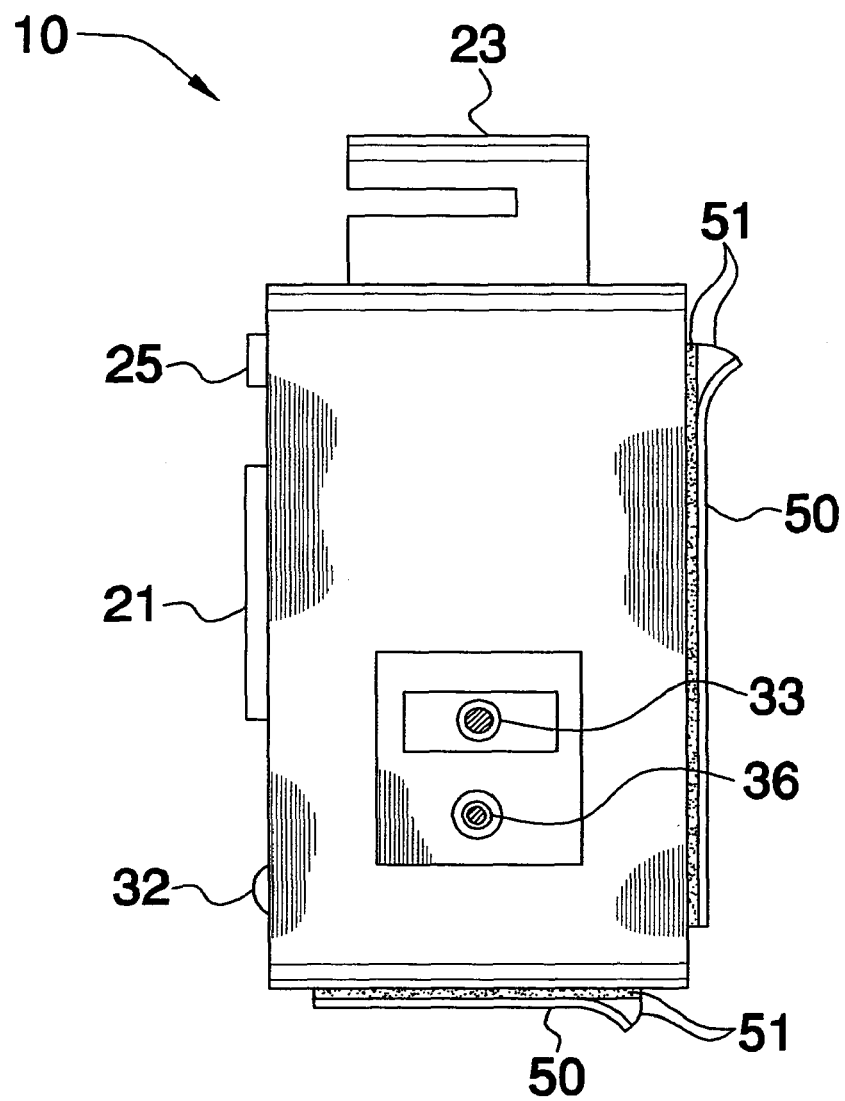
FIG. 2 is a side elevational view of the device shown in FIG. 1, taken along line 2-2.
Figure 4:
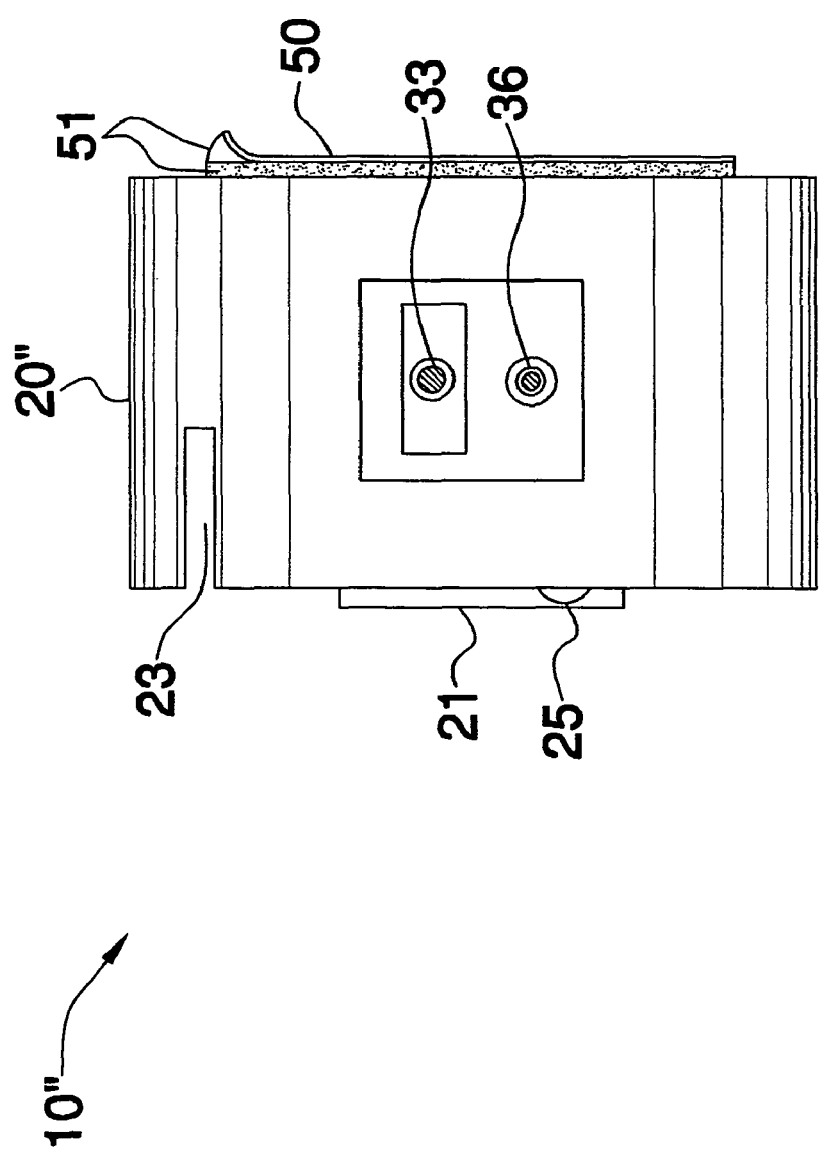
FIG. 4 is a side elevational view of the device shown in FIG. 3, taken along line 4-4.

Referring to FIGS. 1, 2 and 4, the device 10 further includes a mechanism 50 for conveniently supporting the housing 20 against a support surface such that the user may readily bias a position of the housing 20 as needed during operating conditions. In a preferred embodiment, such a supporting mechanism 50 includes a plurality of hook and loop members 51 connected to an outer surface of the housing 20 such that the housing 20 may be removably connected to a support surface and maintained at a substantially fixed position.

Figure 6:
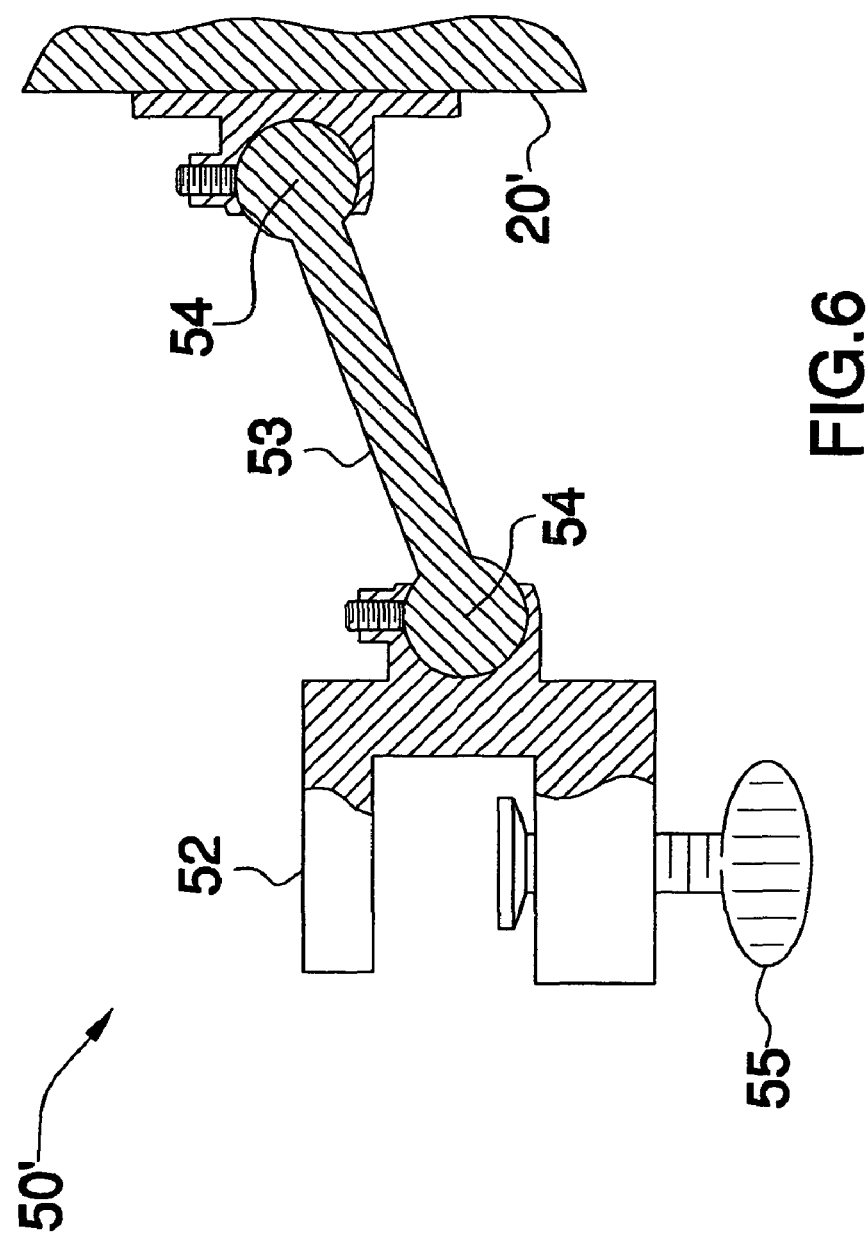
FIG. 6 is a partial cross-sectional view of the supporting mechanism shown in FIG. 5, showing the elongated pivot rod and its associated annular end portions.

Referring to FIGS. 5 and 6, in an alternate embodiment 10', the supporting mechanism 50' includes a mounting bracket 52 removably securable to the support surface and an elongated pivot rod 53 that has annular end portions 54 rotatably connected to the housing 20 and the mounting bracket 52 such that the housing 20 can be selectively articulated between alternating positions for advantageously assisting a user to visually identify the display screen 31 during operating conditions.

Of course, the mounting bracket 52 may have a generally C-shaped cross-section and associated locking pin 55 for mounting to a counter surface, for example. Alternately, the mounting bracket 52' may have a generally rectangular shape with a planar bottom surface 56 for being engaged on top of the support surface via a plurality of fastening members 57, as best illustrated in FIGS. 8 and 9. Of course, in such an embodiment 52', the power source 36 and the communication link 33 may pass through the bottom surface 56 of the mounting bracket 52' or vertically out of the pivot rod 53', as illustrated in FIGS. 8 and 9, respectively.

Referring to FIG. 5, in an alternate embodiment 10', a touch screen interface 24 is included, conveniently allowing the user to interactively exchange data with the device 10 without requiring third party intervention from the register system. This feature further ensures that a user's private and secret information is not disclosed to unauthorized individuals.

Referring to FIGS. 1 through 5, and 7, a plurality of light emitting sources 25 are electrically coupled to the microprocessor 30 and are selectively illuminable during a transaction process such that the user may be readily prompted during the verification process. Such light emitting sources 25 may, of course, include alternately colored lights wherein, for example, one color indicates a successful transaction or authorized card bearer, whereas another color indicates an unsuccessful transaction or an unauthorized card bearer.

Figure 3:
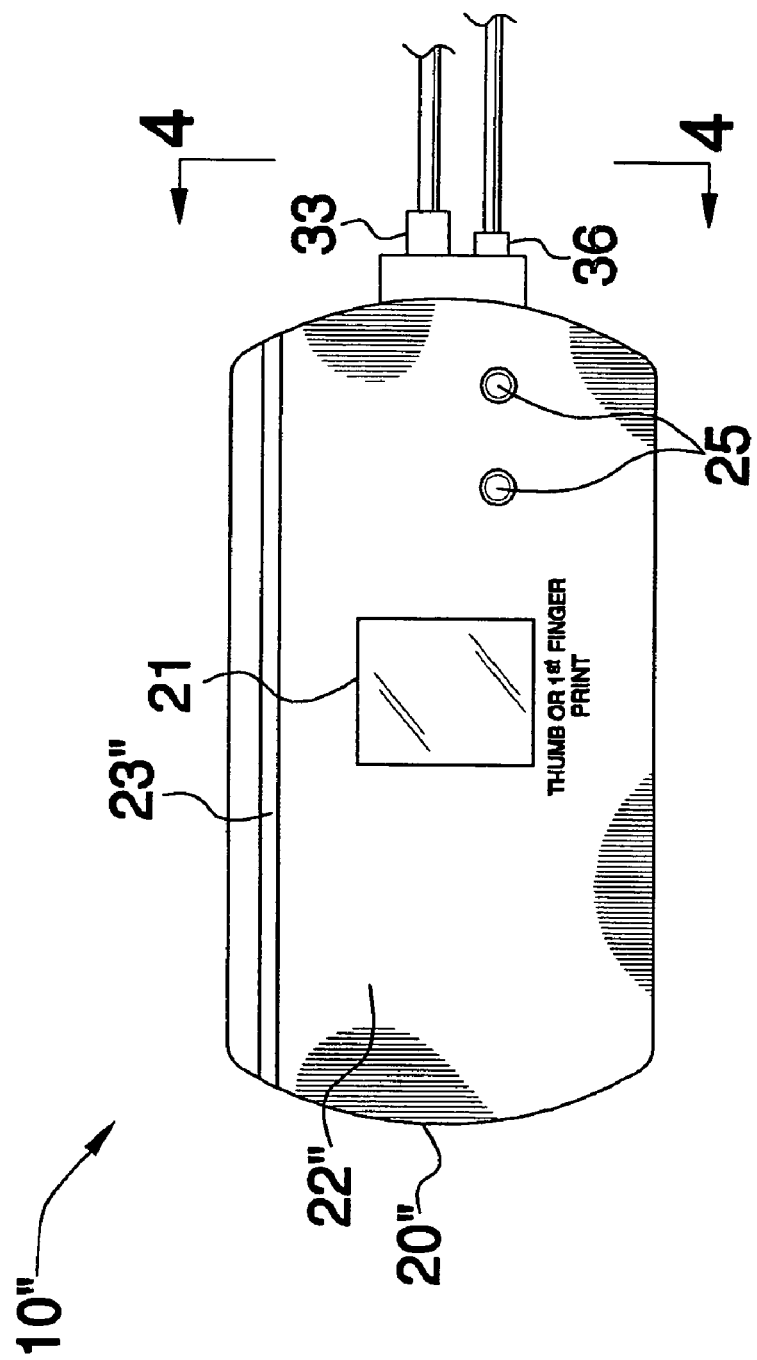
FIG. 3 is front elevational view showing an alternate embodiment of the device shown in FIG. 1.

In yet another embodiment 10", the device 10 only includes the fingerprint reader 21 and the card reader 23, as is best shown in FIGS. 3 and 4. Thus it should be understood that the device 10 may include any combination of the fingerprint reader 21, card reader, 23, touch screen 24, display screen 31 and electronic implement 32, as is illustrated in FIGS. 1, 3 and 5. Furthermore, by using fingerprint verification as a means for identification in all devices 10, 10' and 10", a user is advantageously ensured that no other unauthorized person can use their credit/debit card because each individual has a fingerprint that is unique to them.

Now referring to the improvements claimed in the present application, as shown in FIGS. 10-18, the present invention preferably includes an electronic point-of-sale authorization device 10''' removably attachable to an auxiliary register system (not shown but well known in the art) for verifying the identity of a user during point-of-sale transactions. The electronic point-of-sale authorization device 10''' may include a tray 61 and a housing 20''' directly seated thereon; a microprocessor 30' positioned within the housing 20'''. Further, a memory 40' may be electrically coupled to the microprocessor 30', preferably including software instructions that cause the device 10''' to perform the steps of instructing the user to place at least one metacarpal on a fingerprint reader 21'.

The microprocessor 30' may further cause the scanning of a print of the metacarpal into a temporary storage medium, scanning a remotely located central database preferably housing a plurality of pre-scanned fingerprint data and comparing the user's fingerprint with the database. In this manner, the identity of the user can be determined based on a matching fingerprint data found in the database such that a register system verifies the user's identity if the matching fingerprint data is located in the database and thereby allowing the user to complete the point-of-sale transaction without providing a picture ID.

Figure 10:
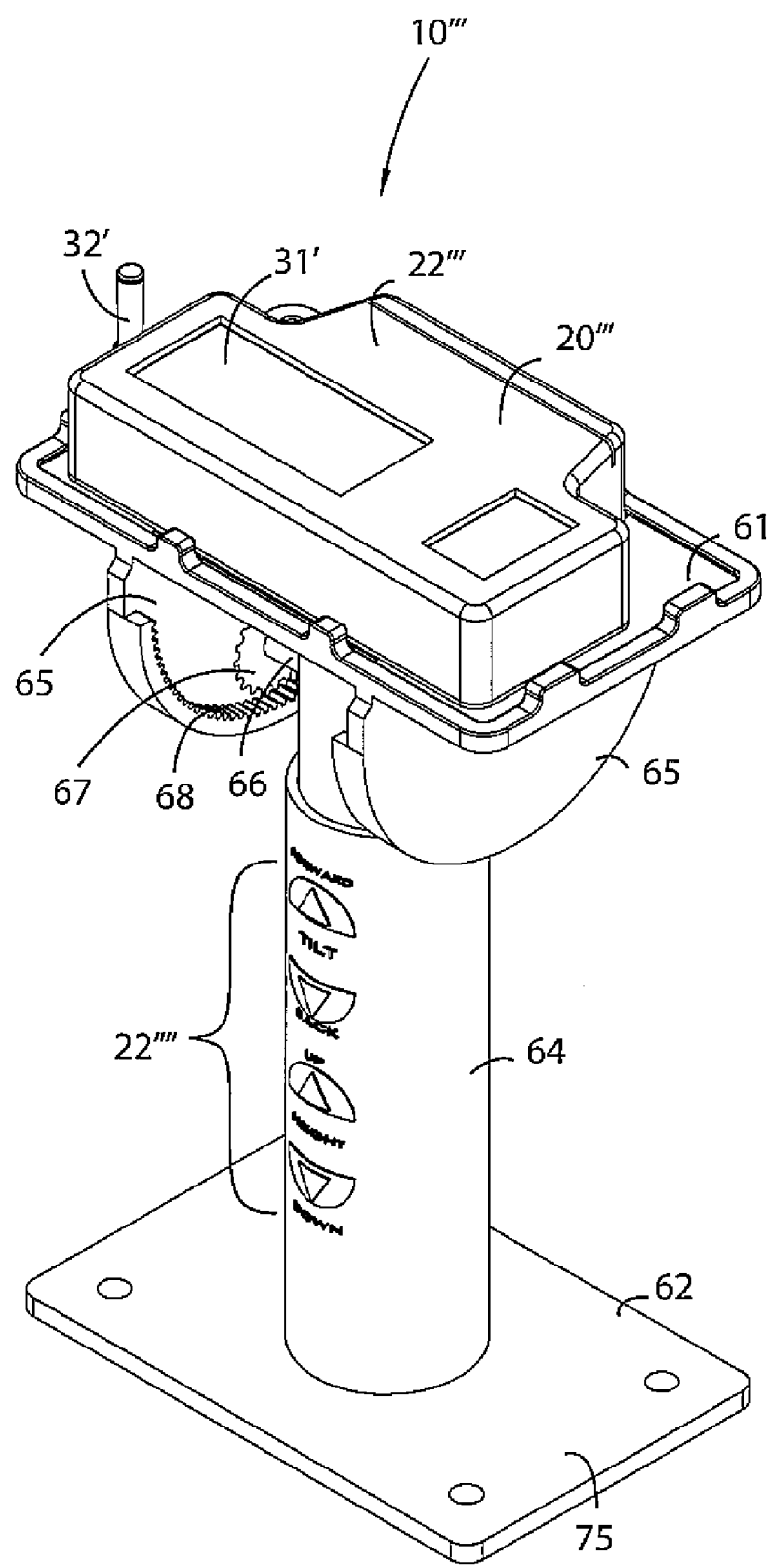
FIG. 10 is a perspective view showing an alternate embodiment of the electronic device for verifying a user's personal information.
Figure 11:
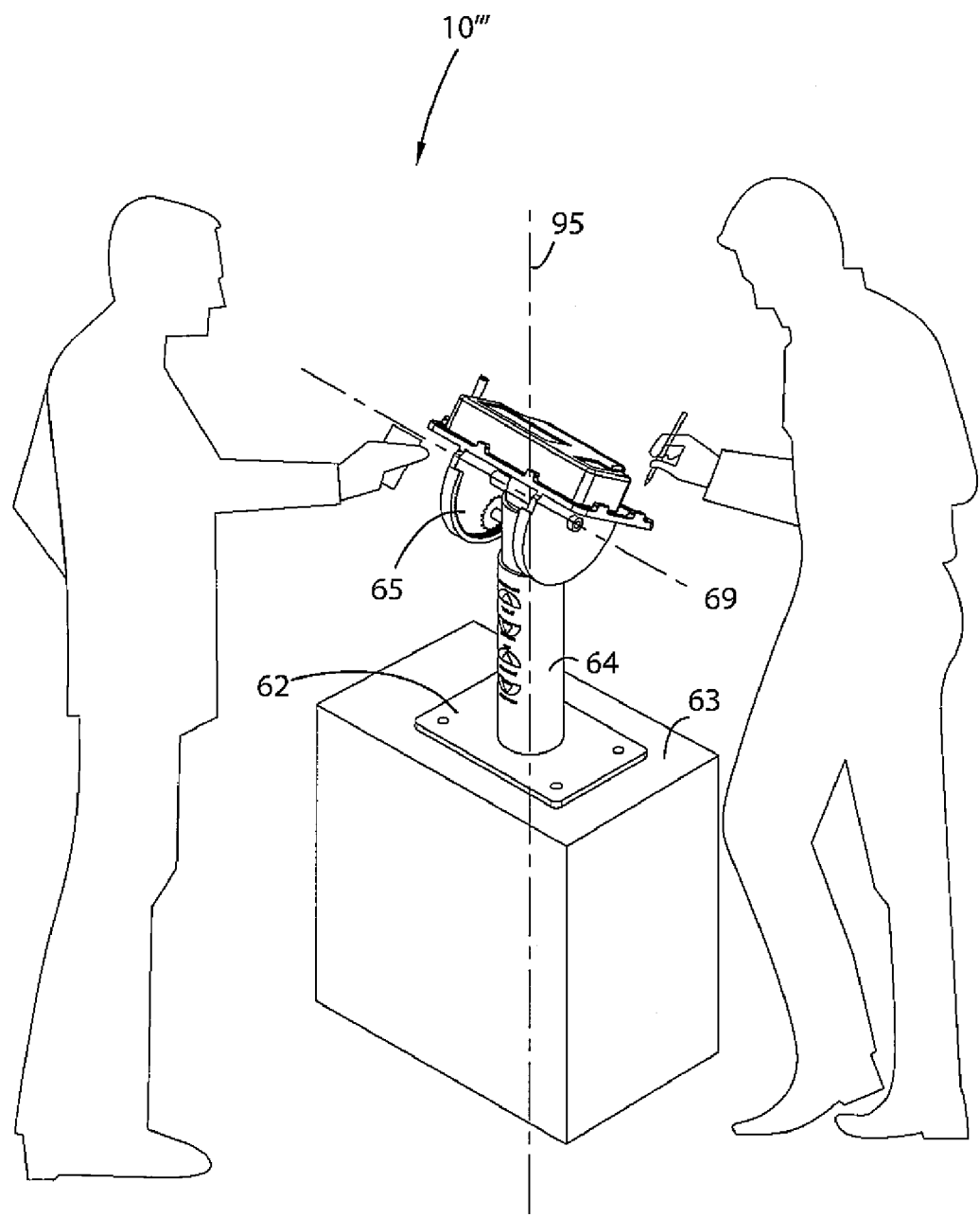
FIG. 11 is another perspective view of the alternate embodiment wherein a customer and a store clerk may access the device as needed.
Figure 17:
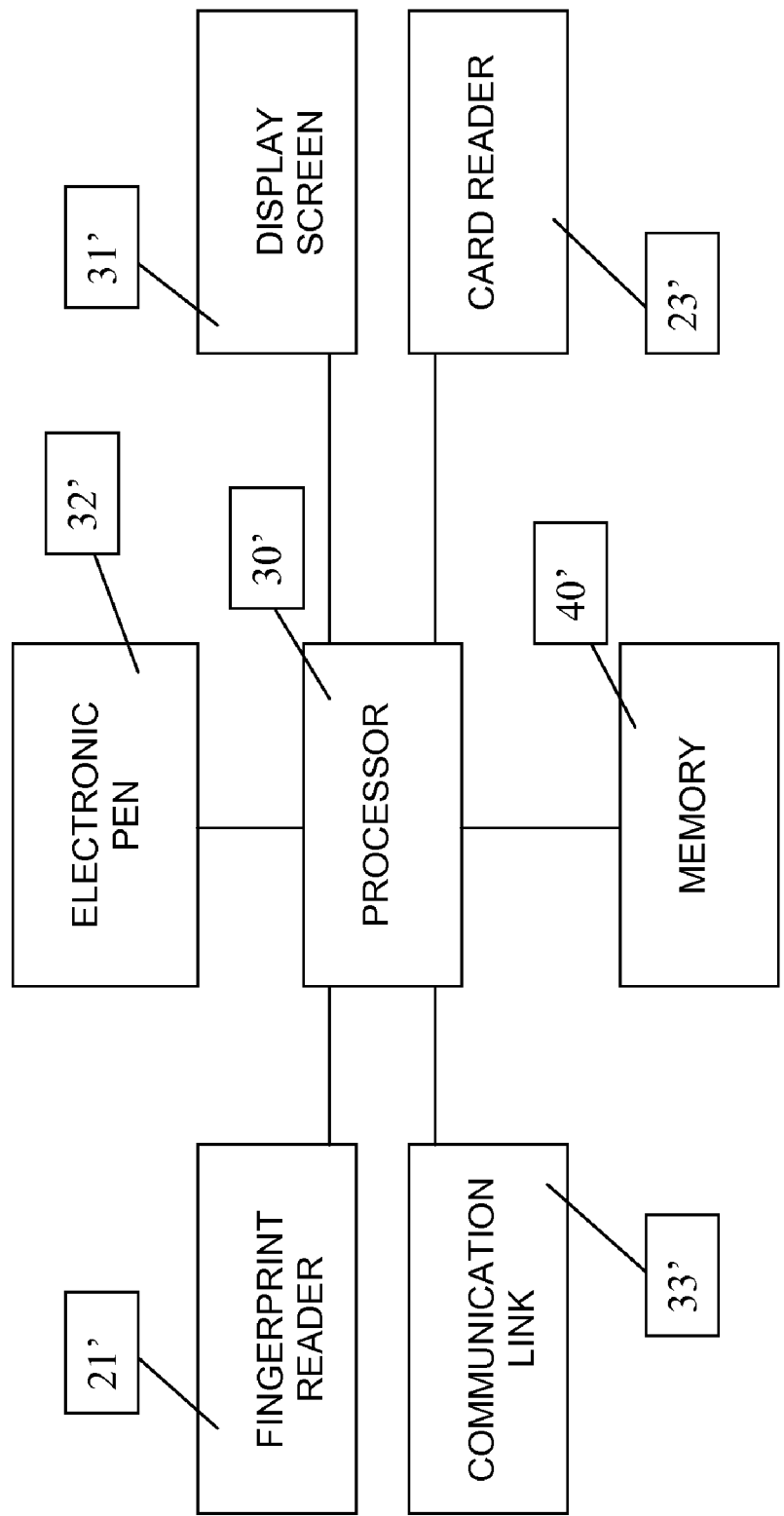
FIG. 17 is a schematic block diagram of the user identity verification mechanism shown in FIG. 10.

Referring to FIG. 10 and FIG. 17, the device 10''' may preferably include a user interface 22''' situated on the housing 20''', such a user interface 22''' preferably including a display screen 31'' and an associated implement 32' electrically coupled thereto such that the user may sign their name on the display screen 31'' in an electronic format. A communication link 33' may be electronically connected to the microprocessor 30' for transmitting data signals to the register system during operating conditions. Additionally, a personal identification card reader 23' may be electrically coupled to the microprocessor 30' such that a user may swipe their identification card through the card, reader 23' to initiate a verification process.

Referring to FIGS. 10-14, notably, the device 10''' may further include a mechanism for pivotally oscillating the housing 20''' and the tray 61 about a pivot axis 69 disposed beneath the tray 61, whereby the pivotally oscillating mechanism may include a mounting bracket 62 adapted to be removably secured to a support surface. Further, pivotally oscillating mechanism may further include a telescopic support rod 64 having a longitudinal axis oriented perpendicular to the pivot axis 69, whereby the support rod 64 further has an axially opposed top end 81 and a bottom end 82 directly coupled to the tray 61 and the mounting bracket 62 respectively.

Again referring to FIGS. 10, 11, 13 and 14, the pivotally oscillating mechanism may further include a pair of cog wheels 65 equidistantly spaced apart from the support rod 64, such that each of the cog wheels 65 may be integrally coupled to the tray 61. The pivotally oscillating mechanism may further include a rectilinear drive shaft 66 passing through the support rod 64 and preferably registered orthogonal to a longitudinal length of the support rod 64; and preferably a pair of spurred gears 67 statically mated to opposed ends of the drive shaft 66 respectively. Each of the cog wheels 65 may further be provided with a toothed arcuate inner surface 68 spaced from the opposed ends of the drive shaft 66, such that the spurred gears 67 are rotatably reciprocated along the toothed arcuate inner surfaces 68 and thereby preferably causing the cog wheels 65 to pivot along a first and second curvilinear paths defined about the pivot axis 69.

Figure 18:
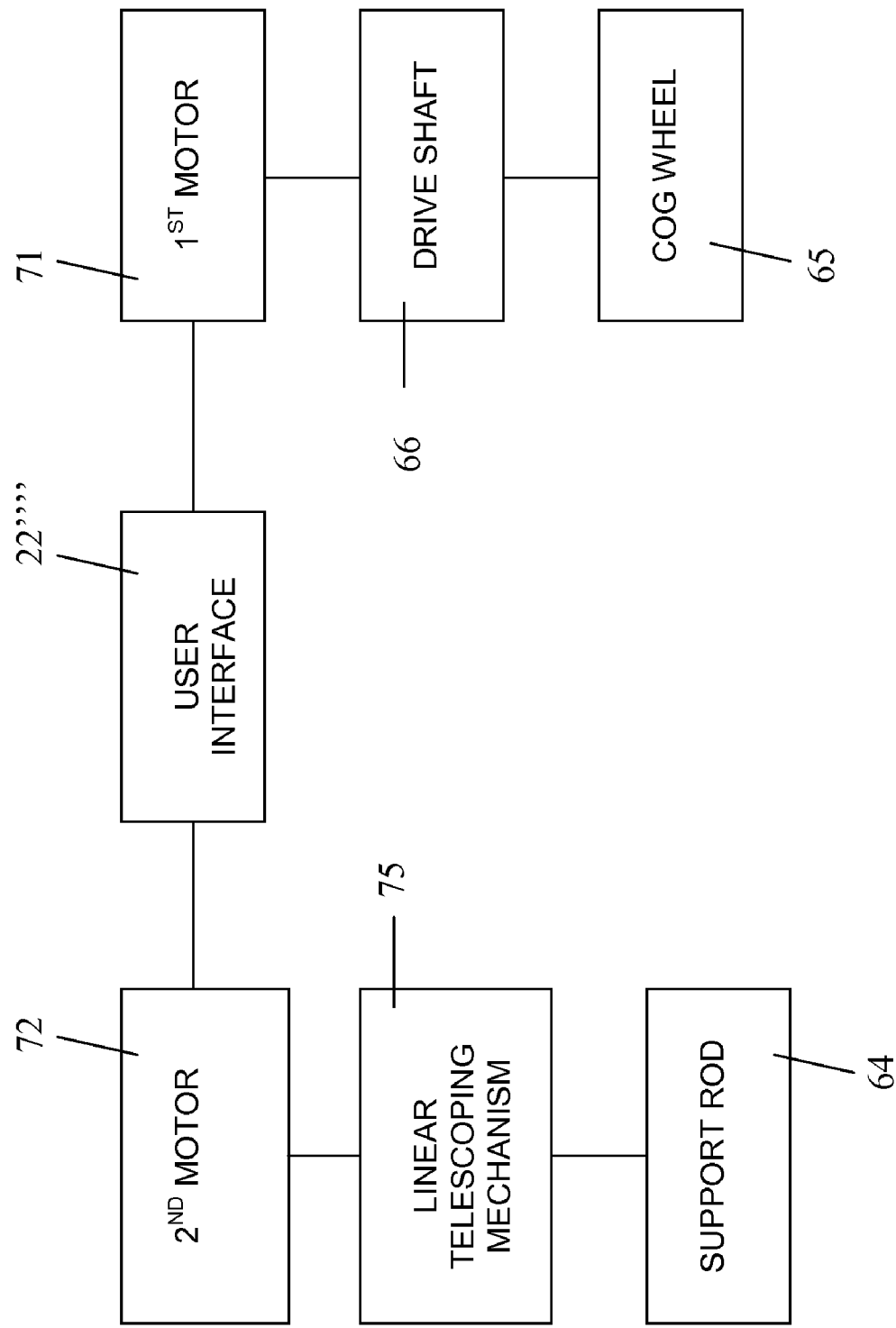
FIG. 18 is a schematic block diagram showing the interrelationship between the main components of the pivotally oscillating mechanism and the linearly telescoping mechanism.

Referring to FIG. 18, the device 10''' may include a first motor 71 communicatively coupled to a user interface 22'''' and the drive shaft 66. In this manner, the first motor 71 preferably may cause the drive shaft 66 to rotate along clockwise and counter clockwise directions upon receiving an input signal from the user interface 22''''. The device 10''' may further include a second motor 72 communicatively coupled to the user interface 22'''' and a linearly telescoping mechanism 75. In this manner, the second motor 72 cooperates with the linearly telescoping mechanism 75 and thereby causes the support rod 64 to linearly reciprocate along a vertical axis 95 defined orthogonal to the pivot axis 69.

Figure 12:
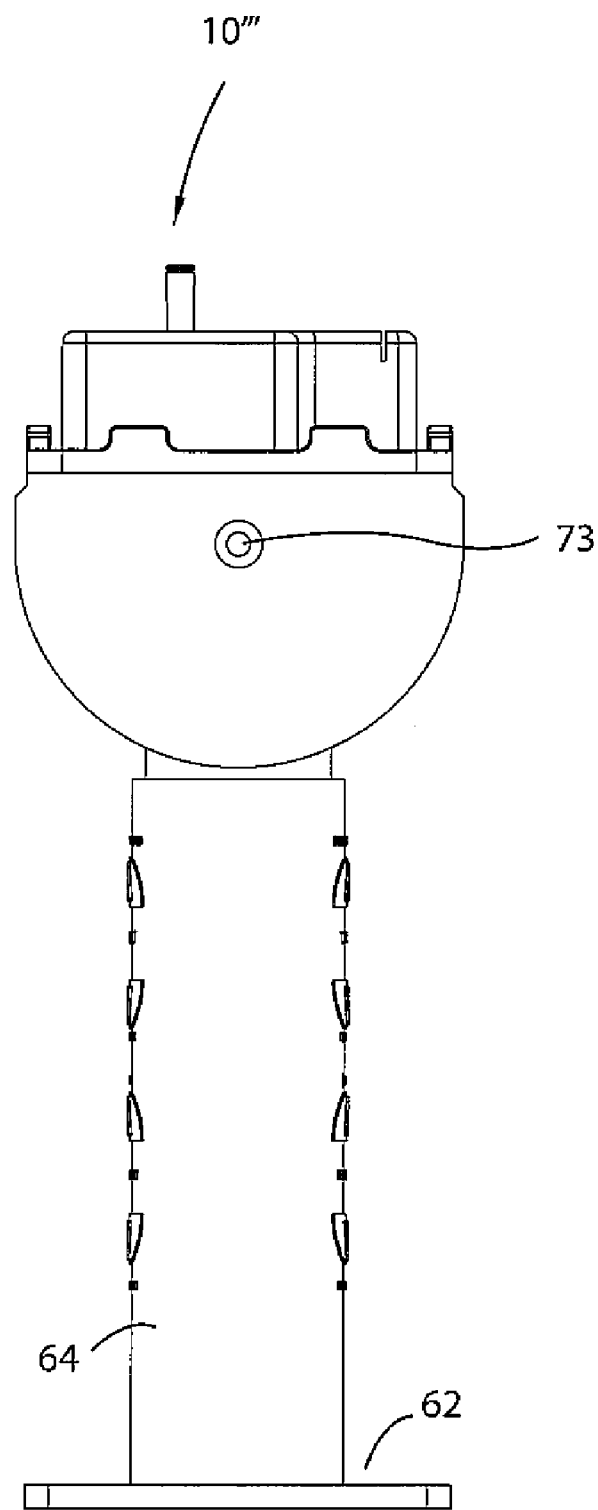
FIG. 12 is a right elevational view of the alternate embodiment.
Figure 13:
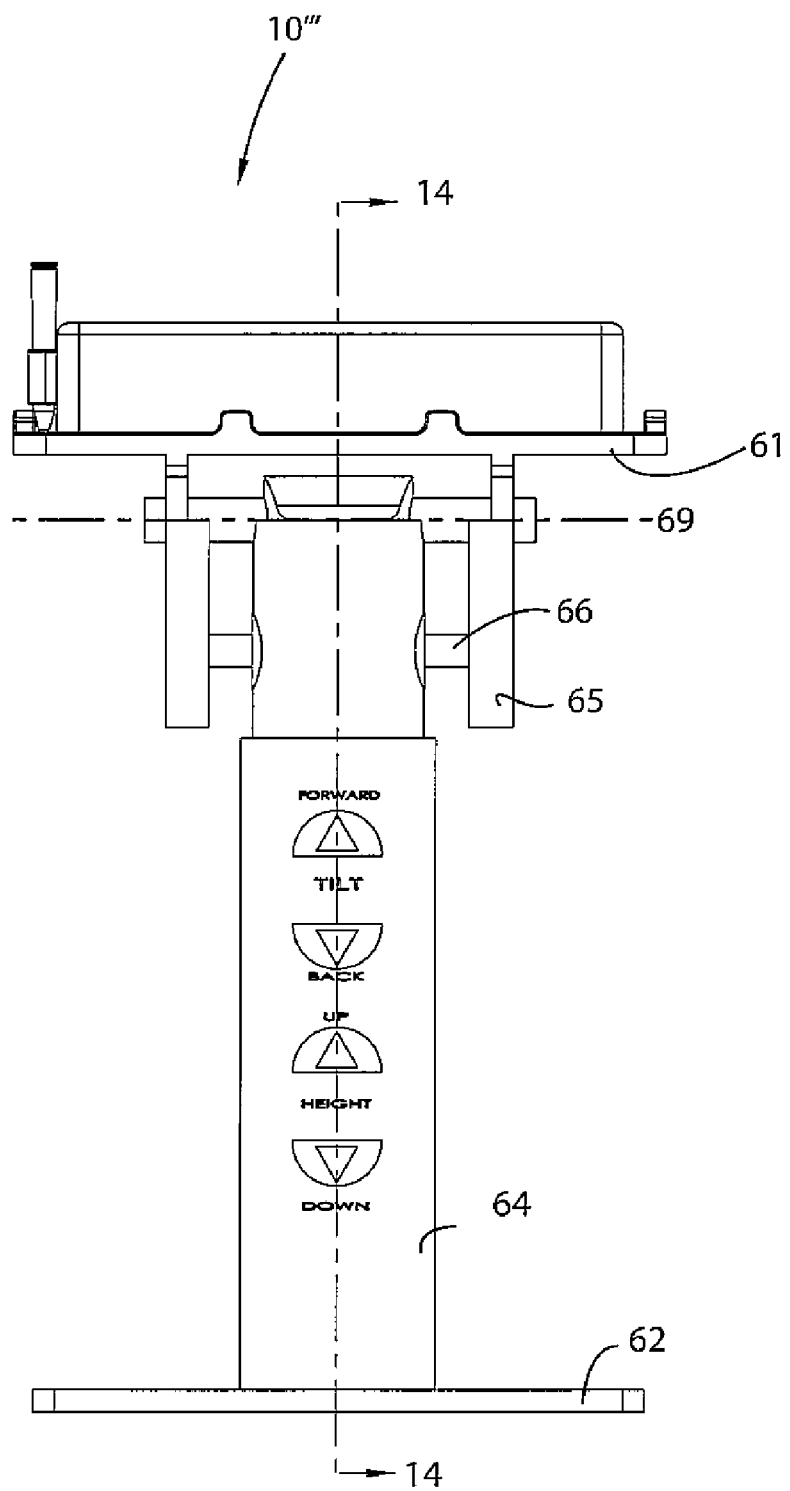
FIG. 13 is a front elevational view of the alternate embodiment.
Figure 14:
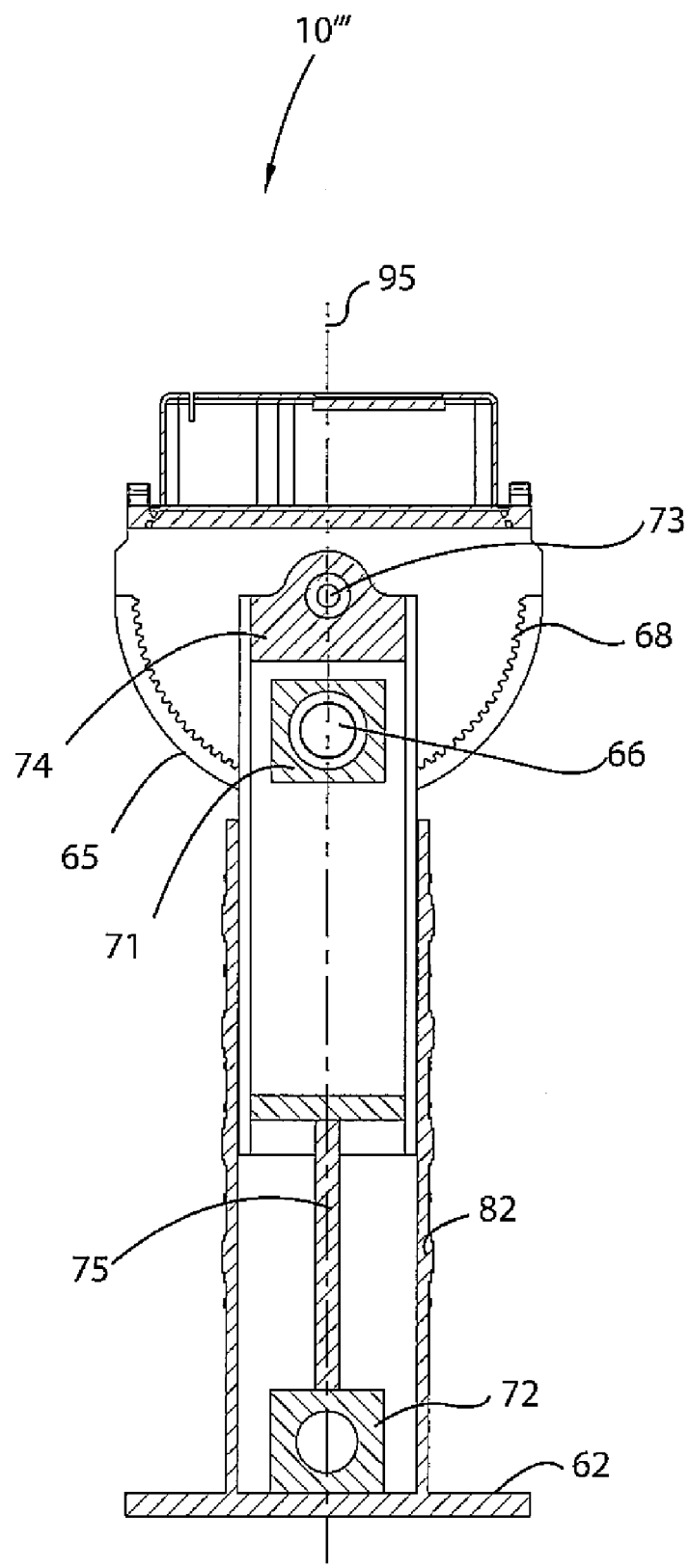
FIG. 14 is a cross-sectional view taken along line 14-14 in FIG. 13.
Figure 15:
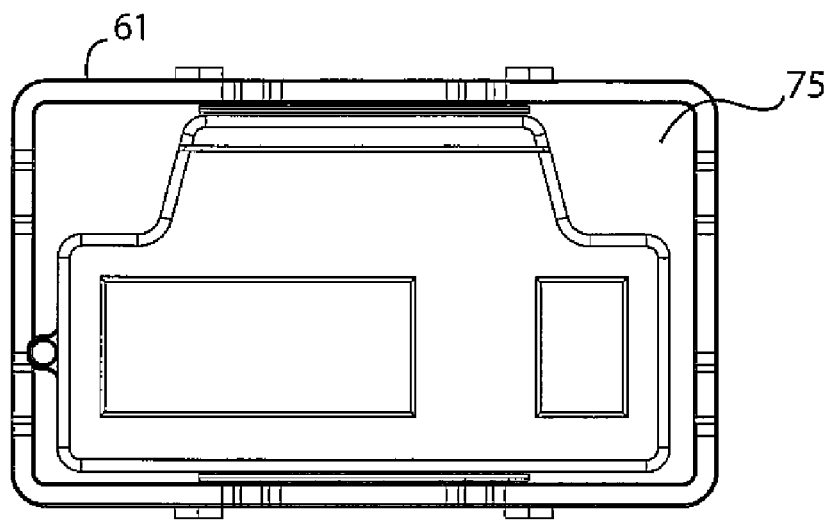
FIG. 15 is a top plan view of the alternate embodiment shown in FIG. 10.
Figure 16:
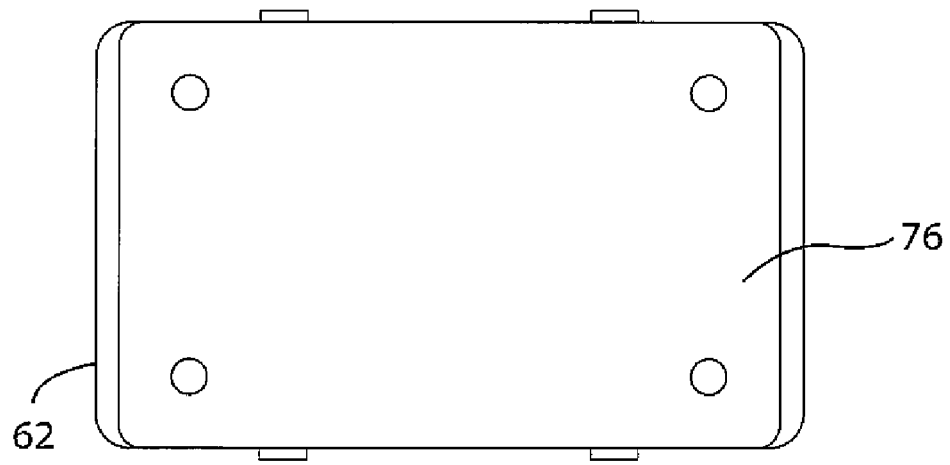
FIG. 16 is a bottom plan view of the alternate embodiment shown in FIG. 10.

Referring to FIGS. 12, 13 and 14, the pivotally oscillating mechanism may further include a rectilinear driven shaft 73 juxtaposed above the drive shaft 66 and statically anchored to the pair of cog wheels 65 respectively. The assembly may further include an anchor block 74 fixedly nested within a top most end of the support rod 64 such that each of the cog wheels 65 simultaneously rotates in sync with the driven shaft 73 as the drive shaft 66 is simultaneously articulated in sync with the spurred gears 67.

In another embodiment, the first motor 71 and the second motor 72 may be simultaneously actuated such that the support rod 64 may telescopically reciprocate along the vertical axis 95 while each of the tray 61 and the housing 20''' may pivotally reciprocates about the pivot axis 69. Advantageously, the tray 61 and the housing 20''' preferably may freely rotate about the pivot axis 69 while both the support rod 64 and the mounting bracket 62 remain at static positions respectively. In this manner, the housing 20''' and the tray 61 may be tilted toward opposed first and second sides of the mounting bracket 62 as the cog wheels 65 rotate in sync along the first and second curvilinear paths respectively.

The present invention provides the unpredictable and unexpected advantage of allowing a store clerk and a customer to easily access and maneuver the housing and tray while the mounting bracket remains statically anchored to a support surface. Such advantages are achieved by communicatively coupling the user interface to the pivotally oscillating mechanism as well as the linearly telescoping mechanism, respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An electronic point-of-sale authorization device removably attachable to an auxiliary register system for verifying the identity of the user during point-of-sale transactions, said electronic point-of-sale authorization device comprising:

a platform and a housing directly seated thereon;

a microprocessor positioned within said housing;

a memory electrically coupled to said microprocessor and including software instructions that cause the device to perform the steps of:

instructing the user to place at least one metacarpal on a fingerprint reader, scanning a print of the metacarpal into a temporary storage medium, scanning a remotely located central database housing a plurality of pre-scanned fingerprint data and comparing the user's fingerprint with the database such that the identity of the user can be determined based on a matching fingerprint data found in the database, wherein the register system verifies the user's identity if the matching fingerprint data is located in the database and thereby allowing the user to complete the point-of-sale transaction without providing a picture ID;

a user interface situated on said housing, said user interface including a display, screen and an associated implement electrically coupled thereto such that the user may sign their name on the display screen in an electronic format;

a communication link operably connected to said microprocessor for transmitting data signals to the register system during operating conditions;

a personal identification card reader electrically coupled to said microprocessor wherein the user may swipe their identification card through said reader to initiate a verification process;

means for pivotally oscillating said housing and said tray about a pivot axis disposed beneath said tray;

wherein said pivotally oscillating means comprises a mounting bracket adapted to be removably secured to a support surface;

a telescopic support rod having a longitudinal axis oriented perpendicular to said pivot axis, said support rod further having axially opposed top and bottom ends directly coupled to said tray and said mounting bracket respectively;

wherein said pivotally oscillating means further comprises:

a pair of cog wheels equidistantly spaced apart from said support rod, each of said Cog wheels being integrally coupled to said tray;

a rectilinear drive shaft passing through said support rod and being registered orthogonal to a longitudinal length of said support rod;

a pair of spurred gears statically mated to opposed ends of said drive shaft respectively;

wherein each of said cog wheels is provided with a toothed arcuate inner surface spaced from said opposed ends of said drive shaft wherein said spurred gears are rotatably reciprocated along said toothed arcuate inner surfaces and thereby cause said cog wheels to pivot along first and second curvilinear paths defined about said pivot axis;

wherein said pivotally oscillating means further comprises:

a first motor communicatively coupled to said user interface and said drive shaft, said first motor causing said drive shaft to rotate along clockwise and counter clockwise directions upon receiving an input signal from said user interface; and a second motor communicatively coupled to said user interface and said drive shaft respectively, said second motor causing said support rod to linearly reciprocate along a vertical axis defined orthogonal to said pivot axis.

2. The electronic point-of-sale authorization device of claim 1, a rectilinear driven shaft juxtaposed above said drive shaft and statically anchored to said pair of cog wheels respectively; and an anchor block fixedly nested within a top most end of said support rod;

wherein each of said cog wheels simultaneously rotates in sync with said driven shaft as said drive shaft is simultaneously articulated in sync with said spurred gears.

3. The electronic point-of-sale authorization device of claim 2, wherein said first and second motors are simultaneously actuated such that said support rod telescopically reciprocates along said vertical axis while each of said tray and said housing pivotally reciprocates about said pivot axis.

4. The electronic point-of-sale authorization device of claim 3, wherein said tray and said housing are freely rotated about said pivot axis while each of said support rod and said mounting bracket remain at static positions respectively.

5. The electronic point-of-sale authorization device of claim 4, wherein said housing and said tray are tilted toward opposed first and second sides of said mounting bracket as said cog wheels rotate in sync along said first and second curvilinear paths respectively.

\* \* \* \* \*